G. D. AND O. J. SUNDSTRAND.
LATHE.
APPLICATION FILED JAN. 18, 1918.
1,325,424.
Patented Dec. 16, 1919.
5 SHEETS—SHEET 4.
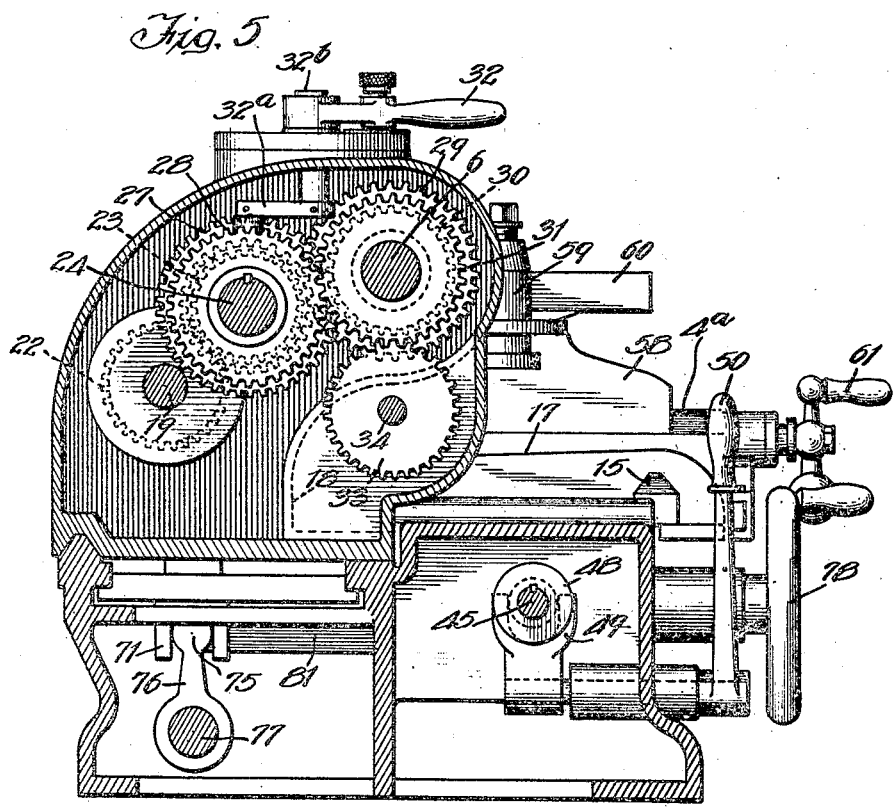
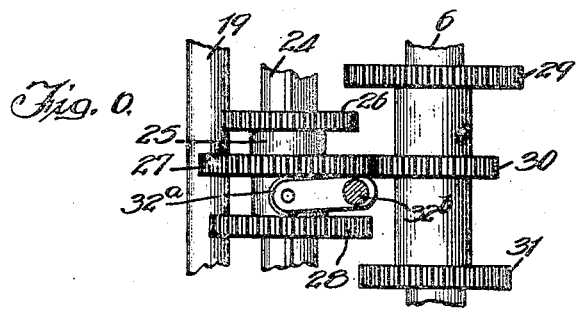

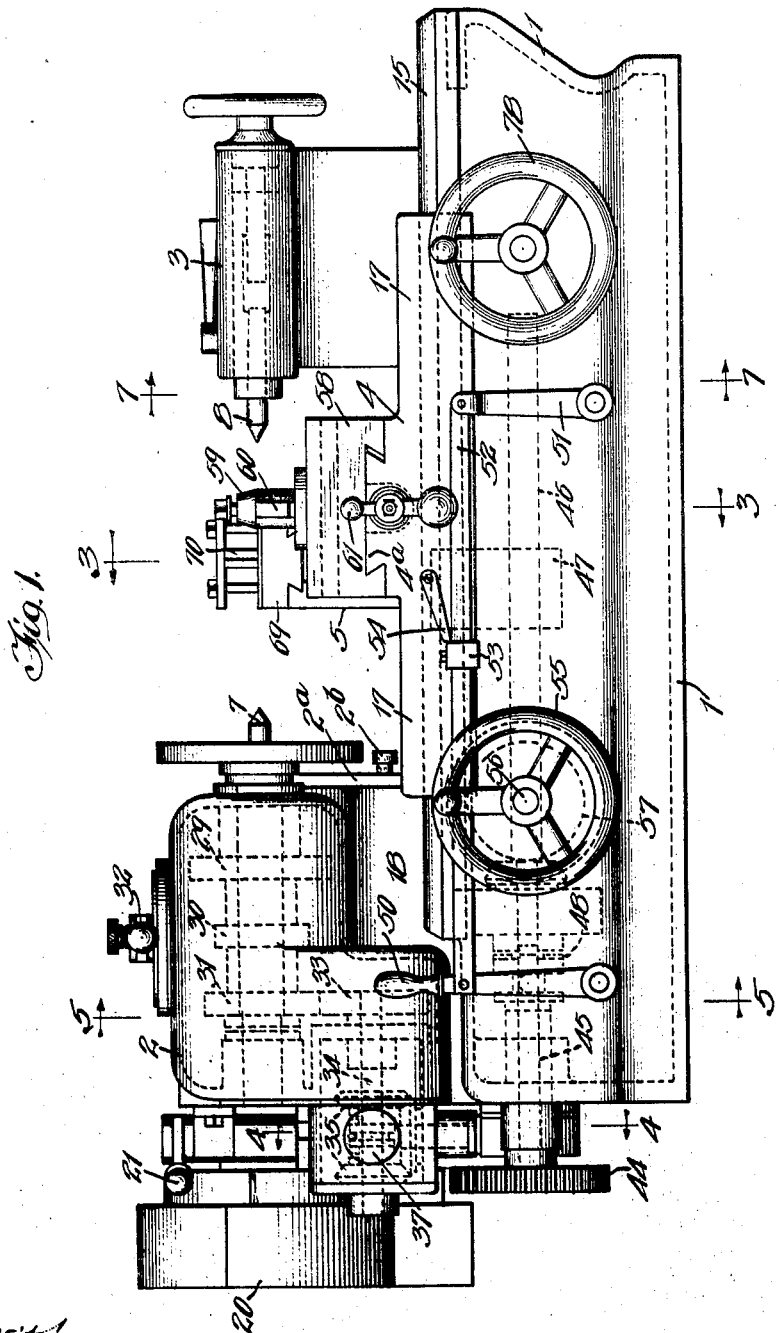

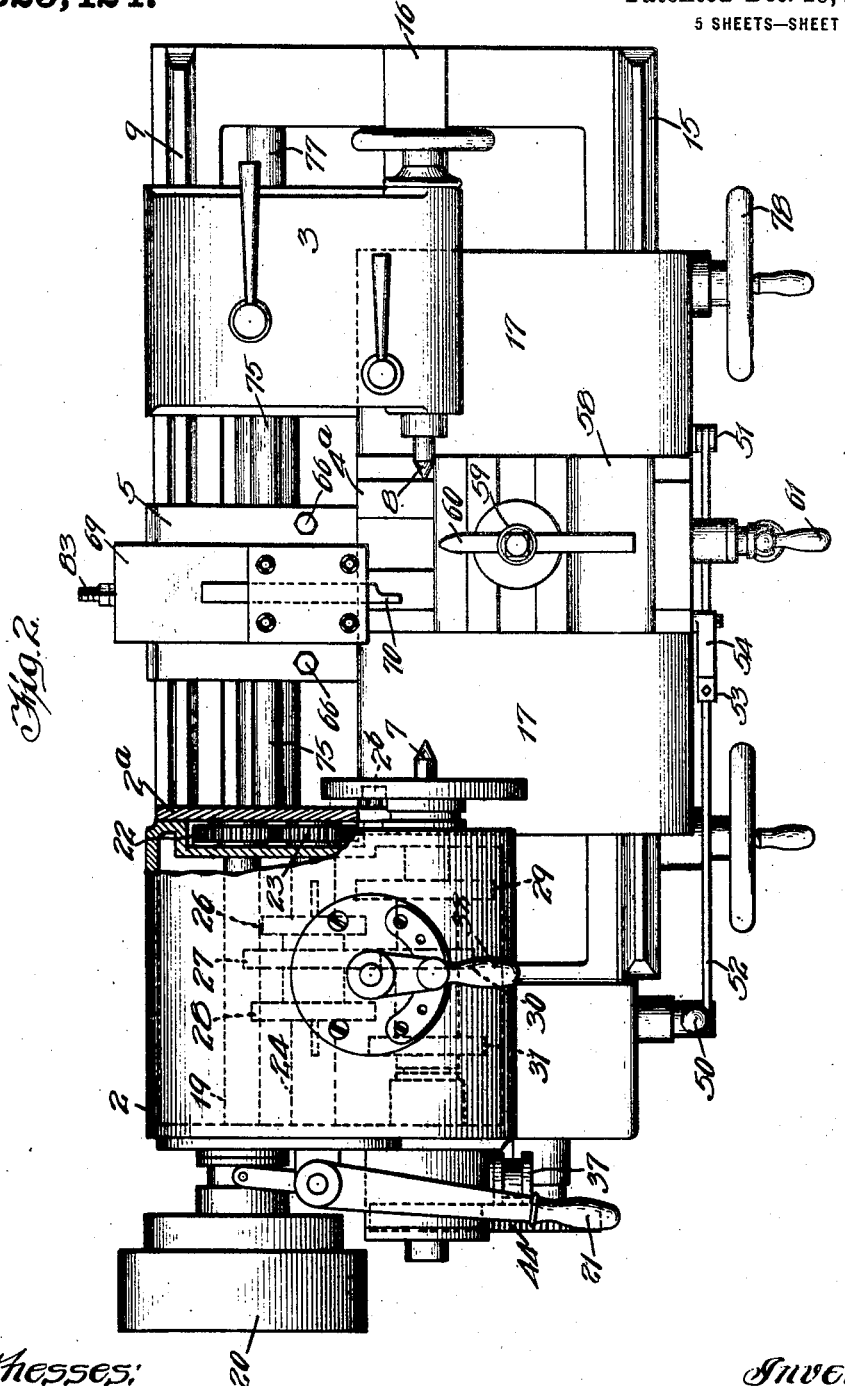

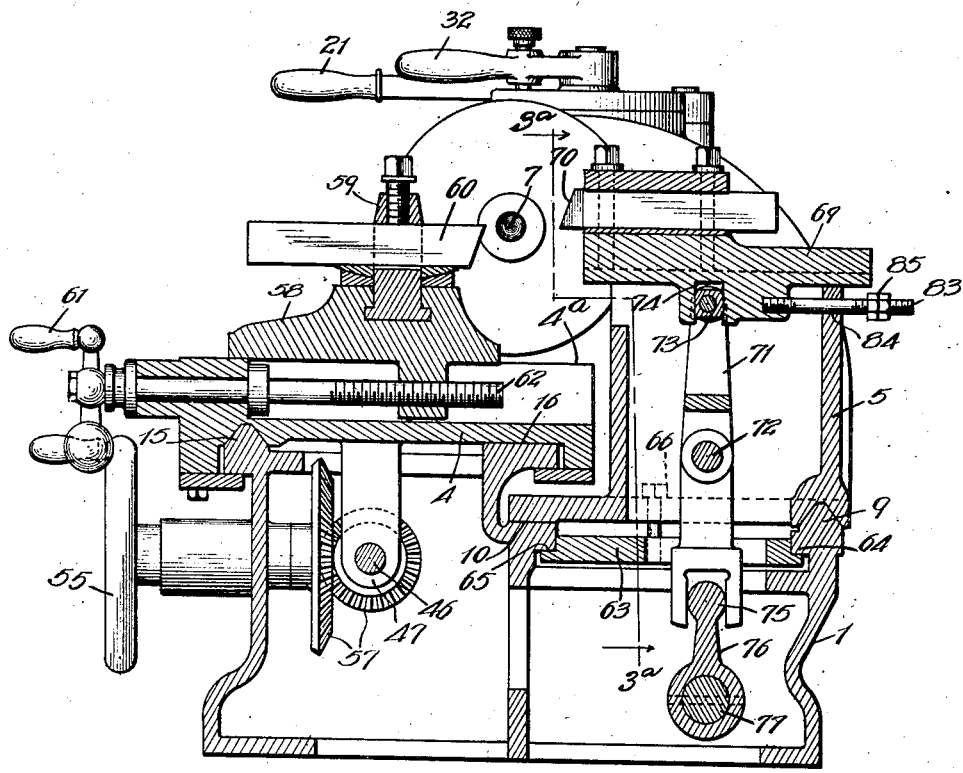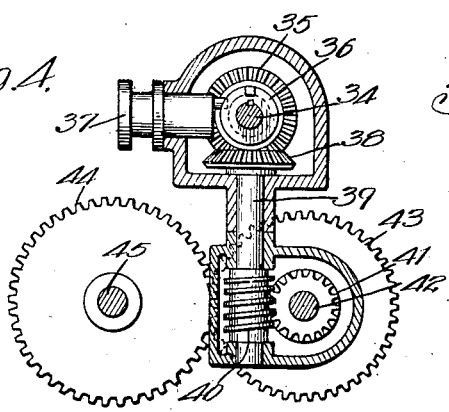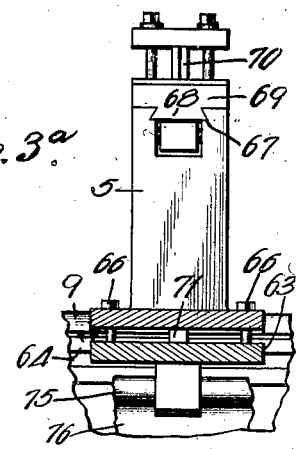

G. D. AND O. J. SUNDSTRAND.
LATHE.
APPLICATION FILED JAN. 18, 1918.

1,325,424.

Patented Dec. 16, 1919.
5 SHEETS—SHEET 5.

UNITED STATES PATENT OFFICE.

GUSTAF DAVID SUNDSTRAND AND OSCAR J. SUNDSTRAND, OF ROCKFORD, ILLINOIS, ASSIGNORS TO ROCKFORD TOOL COMPANY, OF ROCKFORD, ILLINOIS, A CORPORATION OF ILLINOIS.

LATHE.

1,325,424.  Specification of Letters Patent.  Patented Dec. 16, 1919.

Application filed January 18, 1918. Serial No. 212,393.

*To all whom it may concern:*

Be it known that we, GUSTAF DAVID SUNDSTRAND and OSCAR J. SUNDSTRAND, citizens of the United States, residing at Rockford, in the county of Winnebago and State of Illinois, have invented certain new and useful Improvements in Lathes, of which the following is a specification.

One object is to provide a lathe with a supplemental tool-support located at the rear side of the vertical plane passing through the lathe centers and adapted to support a forming or other tool.

A further object is to arrange the ways upon the bed in such manner that the tool-carriage, the tail-stock and the supplemental tool-support shall be effectively supported against the stresses arising in operation.

Another object is to arrange the mounting of the head and tail stocks and the two carriages on the lathe so as to secure a minimum of interference between these in their sliding movement along the bed, and permit of the simultaneous use of both tools over the entire length of any piece of stock within the capacity of the lathe.

A special object is to provide means for controlling both tools from the front of the lathe, which means are conveniently accessible at all times. In the present embodiment this is accomplished by mounting the control means on the front of the lathe bed. This stationary arrangement not only keeps both control elements where they can be simultaneously manipulated at all times, but it also avoids the complicated mechanism necessary to control the tools from moving aprons.

Figure 7:
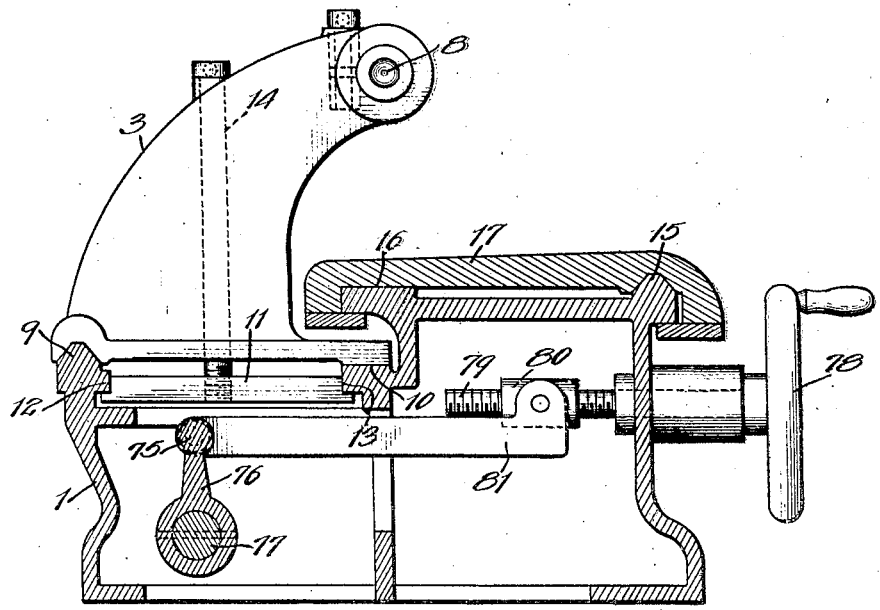
Figure 8:
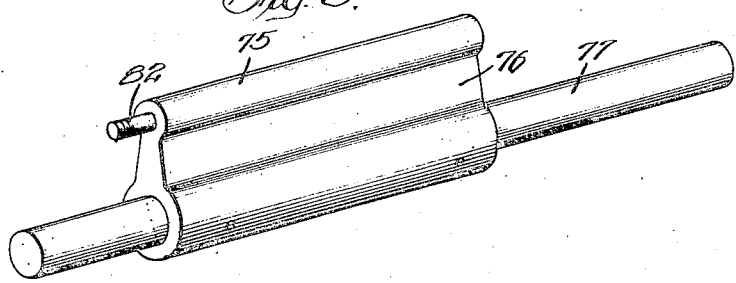

In the accompanying drawings, Figure 1 is a front elevation of the lathe embodying the features of our invention. Fig. 2 is a top plan view of the lathe. Fig. 3 is a transverse vertical sectional view taken in the plane of line 3—3 of Fig. 1. Fig. 3ª is a fragmental side view of the supplemental support on line 3ª—3ª of Fig. 3. Fig. 4 is a section on line 4—4 of Fig. 1. Fig. 5 is a transverse vertical section on line 5—5 of Fig. 1. Fig. 6 is a fragmental top plan view of the gearing for rotating the spindle. Fig. 7 is a section on line 7—7 of Fig. 1. Fig. 8 is a perspective view of an actuating member comprised in the machine.

The embodiment herein shown of our invention comprises a bed 1, a head-stock 2, a tail-stock 3, a tool-carriage 4 and an adjustably mounted tool-support 5. The head-stock 2 may be of any suitable construction and may be secured to the bed 1 in any preferred manner. Rotatably mounted in the head-stock is the spindle 6 having the live center 7. The tail-stock 3 is provided with a center 8. The tail-stock is mounted for adjustment longitudinally of the bed 1 upon two parallel ways 9 and 10 (Fig. 7). The way 9 is located at the rear side of the bed, while the way 10 is located substantially midway of the bed and approximately in the vertical plane of the lathe centers 7 and 8. Devices of any preferred character may be employed to secure the tail-stock rigidly in the desired position upon the ways 9 and 10. Herein we have shown a clamping plate 11 which is rabbeted to underlie flanges 12 and 13 extending longitudinally of and adjacent to the ways 9 and 10, respectively, the plate 11 being engaged by a clamping screw 14 carried by the head-stock. It will be seen that by tightening the screw 14, the flanges 12 and 13 will be firmly clamped between the base of the tail-stock and the plate 11.

The carriage 4 is mounted for movement upon two parallel ways 15 and 16 upon the bed 1. The way 15 is arranged along the forward side of the bed, while the way 16 is located substantially directly above the way 10 and in the vertical plane of the lathe centers 7 and 8. In fact, as shown in Fig. 3, the way 16 extends inwardly (or rearwardly) beyond the vertical plane of the lathe centers. The carriage 4 is provided at opposite ends with guards or extensions 17 which cover the ways 15 and 16 for some distance at either end of the tool-carriage. As shown in Fig. 7, the forward side of the tail-stock 3 is recessed to permit the carriage 4 and the extensions 17 to pass the tail-stock, the upper portion of the tail-stock extending forwardly so as to cause the lathe center 8 to overhang the tool carriage. The head-stock 2 also is recessed as at 18 (Figs. 1 and 5) to accommodate the adjacent extension 17.

The means for rotating the spindle 6 and for traversing the tool-carriage 4 will next be described. In the head-stock 2 is supported a main shaft 19 (Fig. 2) on one end of which is rotatably mounted a driving pulley 20, said pulley being arranged to be connected to the shaft 19 by means of a clutch (not shown) operated by a lever 21. On the other end of the shaft 19 is mounted a change gear 22 that meshes with a change gear 23 on a shaft 24 in the head-stock. The space in which the change gears 22 and 23 are located is provided with a cover 2ª removably secured in place by a suitable number of fasteners 2ᵇ. Slidably mounted upon the shaft 24 is a sleeve 25 which is splined to the shaft so as to rotate therewith. On the sleeve 25 are fixed three gear wheels 26, 27 and 28 adapted to mesh with gear wheels 29, 30 and 31, respectively, on the spindle 6. The sleeve 25 is arranged to be slid by means of an arm 32ª carrying an antifriction roller that lies between the gear wheels 27 and 28, said arm being fixed to a vertical spindle 32ᵇ pivotally supported by the head stock. To the upper end of the spindle 32ᵇ is fixed a hand lever 32. It will be seen that by operation of the hand lever 32 three different speeds of the spindle 6 may be obtained; that by placing the change gear 22 on the shaft 24 and the change gear 23 on the shaft 19, and operating the lever 32 three other speeds may be obtained; and that a large number of other speeds may be had by substituting other change gears for the gears 22 and 23. The convenience with which speed changes may be made induces workmen to select the speeds most suitable for the various jobs presented to them, thereby insuring maximum production.

It will be seen that by using change gears and a change-speed transmission we obviate the necessity of changing belt pulleys. It should also be noted that the mounting of the main drive shaft in the head stock is rendered practicable by locating the change gears at the side of the head stock which is toward the foot of the machine, in which location, of course, the pulley 20 does not prevent access to the change gears.

The gear wheel 31 meshes with a gear wheel 33 fixed on a shaft 34 in the head stock. Loose on the shaft 34 are two bevel pinions 35 (Figs. 1 and 4) which are arranged to be connected to the shaft 34 by means of a clutch member 36 of common construction, said clutch member being arranged to be shifted by means of a hand wheel 37 located on the front side of the head stock and thus readily accessible to the workman. The bevel pinions 35 mesh with the bevel pinion 38 which is fixed upon a vertical shaft 39. Said shaft has a worm 40 that meshes with a worm wheel 41 on a shaft 42. Fixed to the shaft 42 is a spur gear wheel 43 that meshes with a gear wheel 44 on a shaft 45. Alined with the shaft 45 is a lead screw 46 which engages a nut 47 fixed to the tool-carriage 4. The lead screw 46 is arranged to be clutched to the shaft 45 by means of a clutch member 48 which is slidable by means of a fork 49 fixed with relation to a hand lever 50. The hand lever 50 and an arm 51 are connected together in parallel relation by means of a link 52. The arm 51 is pivoted to the bed of the lathe. The link 52 extends along the path of movement of the tool-carriage 4 and is provided with a longitudinally adjustable stop 53 arranged to be engaged by a projection 54 on the tool carriage. In the movement of the carriage toward the left, as viewed in Fig. 1, the projection 54 engages the stop 53 and causes the hand lever 50 to be moved to disengage the clutch collar 48 from the lead screw 46, whereupon the tool-carriage stops. The tool-carriage may also be moved in either direction by suitable means, as, for example, a hand wheel 55 fixed to a shaft 56 which is connected to the lead-screw 46 by means of the bevel gears 57 (Fig. 3).

The lathe herein shown is designed to be capable of revolving the work at high speed. The necessary reduction from the speed of the lathe spindle to the speed of the lead screw 46 is obtained by the use of the worm gearing 40—41. The manually-actuated gears 57 are of such proportionate size as to permit of manually feeding the tool carriage 4 relatively rapidly, if desired.

The tool carriage is provided with a guide 4ª on which is mounted a slide 58 having a tool-post 59 carrying a suitable tool 60. A crank 61 and screw 62 are provided for moving the slide 58 at right angles to the direction of travel of the carriage for the purpose of adjusting the tool 60 toward and away from the work. By reason of the fact that the way 16 and the guide 4ª extend inwardly (or rearwardly) beyond the vertical plane of the lathe centers, the tool-post slide 58 does not overhang the carriage 4 when boring is being done.

The tool support 5 (Fig. 3) is adjustably mounted upon the ways 9 and 10 for movement along said ways. Any suitable means may be provided to hold the tool-support rigidly in adjusted position, as, for example, a plate 63 which is rabbeted to underlie flanges 64 and 65 extending longitudinally of the ways 9 and 10, respectively. The plate 63 is drawn into clamping engagement with the flanges 64 and 65 by means of screws 66 passing through the base of the support 5. Said support is provided with a guideway 67 to receive a dove-tail guide 68 upon a slide 69. Any suitable means may be provided upon the slide 69 to support a tool 70. The slide 69 is movable perpendicularly to the vertical plane passing through the lathe centers 7 and 8 by suitable means, as, for example, a lever 71 pivoted between its ends to the support 5 at 72. The upper end of the lever 71 carries a pivoted block 73 that lies within a fork or slot 74 on the slide 69. The lower end of the lever 71 is forked to receive a bar 75 which is connected by means of a web 76 to a rockshaft 77 journaled in the bed 1 parallel with the ways 9 and 10. The shaft 77 is rocked by means of a hand wheel 78 fixed to a screw 79 which is supported by the bed 1, a nut 80 on said screw being connected by means of a link 81 to a pin 82 fixed to the bar 75. On rotating the hand wheel 78 the bar 75 may be swung to move the slide 69 toward and away from the work, the bar 75 being long enough to remain in engagement with the forked lower end of the lever 71 in all positions of the support 5.

The hand wheels 55 and 78 are duplicates and are mounted at either side of the center of the lathe bed in a convenient position for the workman to grasp. The carriage 17 has no depending apron and may slide past and over the transverse shafts projecting from the lathe bed to carry the hand wheels.

Any suitable means may be provided to limit movement of the slide 69. Herein is shown a screw-threaded rod 83 (Fig. 3) connected to the slide 69 and extending through an opening 84 in the support 5. A nut 85 on the rod 83 is arranged to engage the support 5 to limit forward movement of the slide.

It will be seen that the provision of the tools 60 and 70 renders the machine especially adapted for expeditiously turning pieces having varying diameters, the forming tool 70 imparting the desired form to the work.

By reference to Fig. 7, it will be seen that the way 10 and the flange 13 are approximately in the vertical plane of the lathe centers and therefore in position effectively to resist the upward and downward pressures transmitted to the tail-stock through the center 8 as the work revolves against the tools 60 and 70.

Inasmuch as the flange 65 (Fig. 3) is near the vertical plane passing through the lathe centers, the tool 70 is well supported against the upward pressure of the work.

As hereinbefore pointed out and as illustrated in Figs. 3 and 7, the way 16 also is in the vertical plane of the lathe centers and hence is in advantageous position to resist the downward pressure exerted by the work and transmitted through the tool 60 to the carriage.

We claim as our invention:

1. A lathe having, in combination, a bed, a support on the bed, a tool-slide on the support, a lever pivoted on the support, one arm of said lever being connected to said slide, a member mounted on the bed for swinging movement, said member being in engagement with the other arm of said lever, a screw supported by the bed, a nut on the screw, a connection between the nut and said member, and means for turning the screw.

2. A lathe having, in combination, a bed, a support adjustable longitudinally of the bed, a tool slide mounted on the support for movement transversely of the bed, a lever pivoted on the support, one arm of said lever being connected to said slide, a member mounted on the bed for swinging movement, said member being elongated in the direction of extension of the bed, said member being in slidable engagement with the other arm of said lever, a screw supported by the bed, a nut on the screw, a connection between the nut and said member, and means for turning the screw.

3. A lathe having, in combination, a bed, a support upon the rear portion of the bed, a tool slide on the support, a lever pivoted on the support, one arm of said lever being connected to said slide, a member mounted on the bed for swinging movement, said member being in engagement with the other arm of said lever, a screw supported by and extending transversely of the bed, a nut on the screw, a connection between the nut and said member, and means on the forward end of the screw for turning the latter.

4. A lathe having, in combination, a bed, a support adjustable longitudinally of the bed, a tool slide mounted on the support for movement transversely of the bed, a lever pivoted on the support, one arm of said lever being connected to said slide, a member mounted on the bed for swinging movement, said member being elongated in the direction of extension of the bed, said member being in slidable engagement with the other arm of said lever, and means for swinging said member.

5. A lathe having, in combination, a bed, a pair of spaced parallel ways on said bed, a tail stock on said ways, a lathe center on said tail stock located approximately in the vertical plane of one of said ways, and a tool support on said ways.

6. A lathe having, in combination, a bed, a head-stock on the bed, said bed having a pair of parallel ways thereon, one of said ways being near the forward side of the bed and the other way being approximately centrally located, a tool carriage mounted on said ways, said bed having another pair of parallel ways one of which is near the rear side of the bed and the other of which is beneath the beforementioned centrally-located way, and a tail-stock on the second-mentioned pair of ways.

7. A lathe having, in combination, a bed, a head-stock on the bed, said bed having four parallel ways thereon, one of said ways being near the forward side of the bed, another of said ways being near the rear side of the bed and the other two being located one beneath the other, a tool-carriage on two of said ways, and a tool-support and a tail stock on the other two ways.

8. A lathe having, in combination, a head stock, a tail stock, a tool support, ways carrying said tail stock and tool support, two other ways, and a carriage on said other ways movable past said tool support and tail stock.

9. A lathe having, in combination, a head stock having a live center, a tail stock having a dead center, a tool support, two ways carrying said tail stock and tool support, two other ways, and a carriage on said other ways movable past said tool support and tail stock, one of each of said pairs of ways being located approximately in the vertical plane of said centers.

10. A lathe having, in combination, a bed comprising two portions, one extending forwardly, and the other rearwardly from the center line of said lathe, a head stock and a tail stock on one of said portions, and a tool carriage on the other portion.

11. A lathe having, in combination, a bed comprising two portions, one extending forwardly, and the other rearwardly from the center line of said lathe, a head stock, a tail stock, and a tool carriage on one of said portions, and a second tool carriage on the other of said portions.

12. A lathe having, in combination, a bed comprising a front and a rear portion, a head stock, a tail stock and a tool carriage on one of said portions and a second tool carriage on the other of said portions.

13. A lathe having, in combination, a bed comprising a forwardly extending and a rearwardly extending portion, a pair of ways on each of said portions, a head stock, a tail stock, and a tool carriage on one of said pairs of ways, and a second tool carriage on the other pair of ways slidable past said tail stock and tool carriage.

14. A lathe having, in combination, a bed comprising a forwardly extending and a rearwardly extending portion, a head stock, a tool carriage and a tail stock on one of said portions, and a second tool carriage on the other of said portions, said head stock and tail stock being offset to provide clearance for the sliding motion of the tool carriage on the other portion of the bed, and said tool carriages being slidable past each other.

15. A lathe having, in combination, a double bed, a front tool carriage on the front portion of said bed, a rear tool on the rear portion of said bed, an actuating shaft and a connection between said shaft and said front carriage for feeding the same, a second shaft and a connection between said second shaft and said rear tool for feeding the same, means for actuating said first mentioned shaft manually or by power, and means for manually actuating said second shaft, said means being all fixedly mounted on the front of said bed.

16. A lathe having, in combination, a double bed, a front tool carriage on the front portion of said bed, a front tool on said carriage, a rear tool on the rear portion of said bed, and means mounted on the front of said bed for the control of both of said tools, said front carriage being slidable over said control means.

17. A lathe having, in combination, a bed, a head stock, a tail stock, front and rear tool carriages slidable past each other, a longitudinally extending actuating shaft for each of said tool carriages, and separate control means in front of the lathe for each of said actuating shafts, said control means including manual control elements rotatable about spaced axes separated by an invariable distance.

18. A lathe having, in combination, a double bed, a front tool on the front portion of said bed, a rear tool on the rear portion of said bed, a drive shaft extending longitudinally inside said bed, and control elements mounted on the front of said bed for controlling said tools.

19. A lathe having, in combination, a bed, a carriage on said bed, a drive shaft extending longitudinally inside said bed, a plurality of control elements mounted on the front of said bed, certain of said elements controlling said drive shaft and carriage.

20. A lathe having, in combination, a double bed, a front tool and a rear tool on said bed, an actuating shaft for each tool and control means mounted on the front of said bed, said actuating shafts extending inside said bed.

21. A lathe having, in combination, a double bed, a front tool and a rear tool on said bed, an actuating shaft for each tool, and control means mounted on the front of said bed, said shafts being both located to the rear of the front wall of said bed.

22. A lathe having, in combination, a double bed, a front tool carriage on said bed, a front tool on said carriage, a rear tool on said bed, an actuating shaft for each tool, and control elements mounted on the front of said bed, both of said actuating shafts being located to the rear of the front wall of said bed, and said carriage being slidable over said control elements.

In testimony whereof we have hereunto set our hands.

GUSTAF DAVID SUNDSTRAND.
OSCAR J. SUNDSTRAND.